United States Patent [19]

Chawla et al.

[11] 4,429,840

[45] Feb. 7, 1984

[54] WINDING SPRING ESPECIALLY FOR SEAT BELT RETRACTOR

[75] Inventors: Jai H. Chawla, Knoxville, Tenn.; Arduino Colasanti, East Detroit, Mich.

[73] Assignee: Allied Corporation, Morris Township, Morris County, N.J.

[21] Appl. No.: 362,185

[22] Filed: Mar. 26, 1982

[51] Int. Cl.³ ............................................. B65H 75/48
[52] U.S. Cl. .................................. 242/107; 242/107.7
[58] Field of Search ........................... 242/107–107.7; 185/37; 267/156, 157; 280/803, 806, 807, 808; 297/474–478

[56] References Cited

U.S. PATENT DOCUMENTS

| | | | |
|---|---|---|---|
| 3,251,627 | 5/1966 | Fisher | 297/388 |
| 4,084,764 | 4/1978 | Mogerlein et al. | 242/107 |
| 4,253,620 | 3/1981 | Takei et al. | 242/107 |
| 4,301,977 | 11/1981 | Yang | 242/107 |

*Primary Examiner*—Leonard D. Christian
*Attorney, Agent, or Firm*—Roger H. Criss

[57] ABSTRACT

A rewind spring motor assembly, useful in a seat belt retractor, including a drive soppl and an idler spool, and a rewind spring having a stretched S-shape between the spools. The spring has a normal use region extending from the drive spool towards the idler spool and includes a first portion having a first natural radius of curvature and a second portion having a second natural radius of curvature greater than the first natural radium of curvature. The transition between the first and second portions is defined by an abrupt increase in the natural radius of curvature. In use in a seat belt retractor, this abrupt increase results in an abrupt change in the extraction and retraction forces, so that a wearer definitely notices a reduced rewind force. Also, in the rewind mode, the abrupt increase in rewind force assists full stowing of the seat belt webbing on the retractor.

10 Claims, 4 Drawing Figures

WINDING SPRING ESPECIALLY FOR SEAT BELT RETRACTOR

DESCRIPTION

BACKGROUND OF THE INVENTION

1. Field of the Invention

This invention relates to rewind springs and particularly to rewind springs for seat belt retractors.

2. Description of the Prior Art

The characteristics of the rewind spring on seat belt retractors has a significant impact on the comfort and convenience of the system to the user. Conventional rewind springs produce a torque which increases as webbing is extracted. Since sufficient retraction force is necessary to completely stow the webbing when the belts are unbuckled, many users find the resulting belt pressures on the body uncomfortable. This is particularly true when the parking torque must be initially high to lift relatively heavy buckle tongues having an adjust feature. In addition, the act of extracting webbing for purposes of buckling up is annoying and difficult for some when these forces continue to increase.

To counteract some of these complaints, numerous tension eliminating and reducing devices have been suggested by the industry to provide comfort to the user when the belt is worn. However, such retractors are made more complicated, and in many of the designs the user must intentionally manipulate the webbing or actuate a push button to obtain the desired comfort. This detracts from an ideal situation in which the desired features are provided automatically.

A negator type of rewind spring is known to produce a substantially constant force of extraction/retraction characteristics, such as is described in U.S. Pat. No. 3,251,627 to Fisher. However, the cost benefit of such devices has not been sufficient as many users still consider the retracting forces in the wear zone to be uncomfortable. Likewise, it is known that by gradually varying the free coil diameters of the rewind spring, the extraction/retraction forces can be made to gradually decline with the amount of webbing extracted, as discussed in U.S. Pat. No. 4,253,620 to Takai, et al. Although this approach has some advantages, it will be recognized that during extraction the drop-off of force is so gradual that the wearer does not fully appreciate the added convenience. Likewise, in the wear zone, the retracting forces are not reduced to the maximum potential due to the gradual change in retracting force, i.e., a small person would feel greater forces than larger persons, as the retraction forces tend to be inversely proportional to the amount of webbing extracted.

Accordingly, it would be desirable to provide a rewind spring that produces the required parking force and yet provides significant convenience to the user when donning the belt. In addition, it would be desirable to provide a rewind spring that in the wearing zone, the retraction forces would keep the webbing against the body of the user with minimum force possible and still maintain that force as a constant regardless of occupant's size or seat position.

SUMMARY OF THE INVENTION

In accordance with this invention, there is provided a rewind spring motor assembly comprising a drive spool, an idler spool and a rewind spring having a stretched S-shape disposed between the drive spool and the idler spool; the rewind spring having a first end in communication with the drive spool; a second end in communication with the idler spool; a normal use region extending from the drive spool towards the idler spool and comprising a first portion in communication with the first end and having a first natural radius of curvature, and a second portion in communication with and extending from the first portion towards the idler spool, the second portion having a second natural radius of curvature, the second natural radius of curvature being larger than the first natural radius of curvature, the transition between the first and second portions being defined by an abrupt increase in the natural radius of curvature; and a surplus use region extending from the second portion to the second end of the spring.

Further in accordance with this invention, there is provided in a seat belt retractor comprising a frame, a main shaft rotatable in the frame, a spool mounted on the shaft for rotation therewith, seat belt webbing having one end attached to the spool and adapted to be wound thereon, and a rewind spring motor mounted on the frame for winding the webbing on the spool and permitting the webbing to be extracted from the spool, the improvement comprising:

the rewind spring motor comprising:
a drive spool rotatable with the main shaft;
an idler spool mounted for rotation about a second shaft spaced from the main shaft; and
a rewind spring having a stretched S-shape and disposed between the drive spool and the idler spool, the rewind spring having a first end in communication with the drive spool, a second end in communication with the idler spool, a normal use region extending from the drive spool towards the idler spool and comprising a first portion in communication with the first end and having a first natural radius of curvature, and a second portion in communication with and extending from the first portion towards the idler spool, the second portion having a second natural radius of curvature, the second natural radius of curvature being larger than the first natural radius of curvature, the transition between the first and second portions being defined by an abrupt increase in the natural radius of curvature, and a surplus use region extending from the second portion to the second end of the spring.

The rewind motor of this invention is characterized by an abrupt shift in the natural radius of curvature between the first and second portions of the spring in the normal use region. As a result, a defined transition zone is obtained wherein the extraction and retraction forces are abruptly changed. The wearer is thus more cognizant of the reduced rewind and extraction forces. Furthermore, a higher parking force is obtained compared with the spring shown in the Takai, et al. patent, thus insuring full stowing of the webbing without an increase in rewind force in the wear zone. Preferably, the natural radii of curvature in the first and second portions are substantially constant throughout the length of such portions and as a result, the rewind force is uniform regardless of the size of the occupant or position of the seat.

DESCRIPTION OF THE PREFERRED EMBODIMENTS

Figure 1:
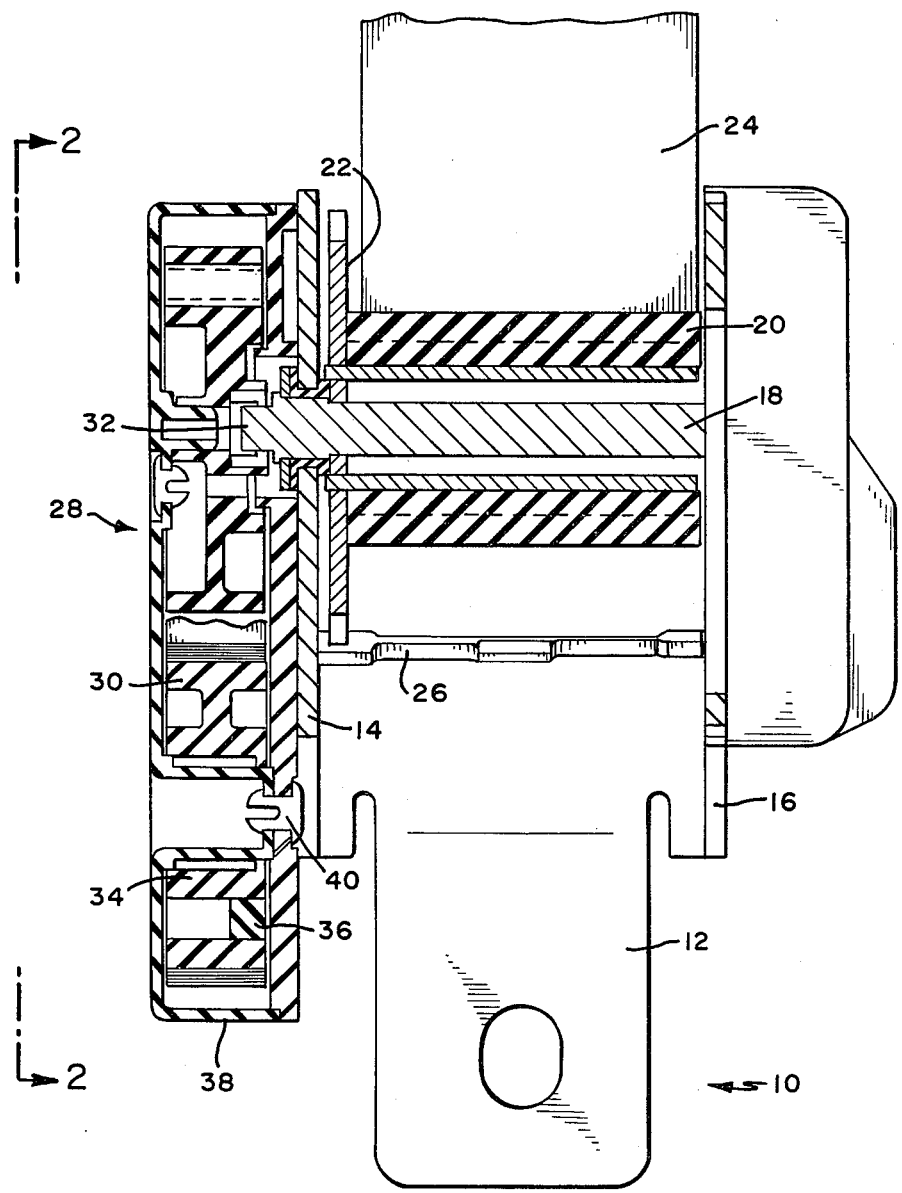
FIG. 1 is a side view of a seat belt retractor incorporating the spring motor of this invention.

With reference to FIG. 1, there is shown a seat belt retractor, generally indicated at 10, including a U-shaped frame 12 having upstanding side flanges 14, 16. Shaft 18 is journalled for rotation in flanges 14, 16. Spool 20 is mounted on shaft 18 for rotation therewith and has one or more ratchet wheels 22 attached thereto for rotation therewith. Seat belt webbing 24 has one end attached to spool 24 and is adapted to be wound up and extracted from frame 12. Lock bar 26 extends between flanges 14, 16 and is adapted to engage ratchet wheel 22 in order to lock the retractor in a known manner.

Figure 3:
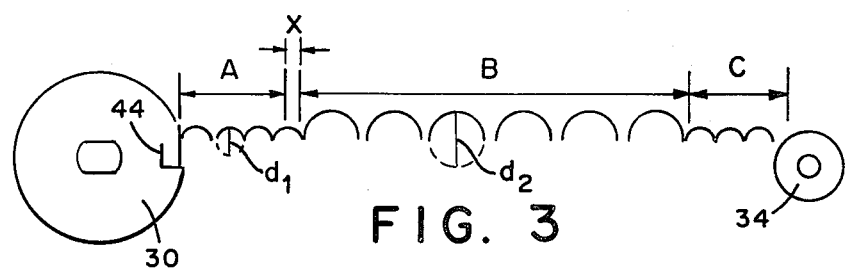
FIG. 3 is a view showing the radii of curvature of the spring.

In accordance with this invention, a rewind spring motor assembly 28 is provided to bias webbing 24 towards frame 12. Drive spool 30 is mounted on one end 32 of shaft 18 that extends through flange 14. Spaced from drive spool 30 is a smaller idler spool 34 which is rotatable about stem 36 which extends from housing 38 that encloses spring motor assembly 28. Housing 38 is secured to flange 14 via one or more rivets 40. Extending between drive spool 28 and idler spool 34 is rewind spring 42. One end 44 of spring 42 is attached to drive spool 28 and the opposite end is attached to idler spool 34. Rewind spring 42 has a stretched S-shape as it extends from the spools. Rewind spring 42 has a curling property such that it normally is wound up on drive spool 28 to wind webbing 24 on spool 20. FIG. 3 depicts spring 42 diagramatically after it has been initially formed. The normal use region of spring 42 includes regions A and B, with region A representing the spring coils necessary to fully stow webbing 24 on spool 20 and region B representing the normal wear zone. The coils of spring 42 in region A have a diameter $d_1$ which is relatively small. Preferably, this diameter is substantially constant throughout the entire length of region A. Between regions A and B is a transition zone X, which begins at a point slightly before the minimum amount of webbing that is extracted by a small person with the vehicle seat in the full rearward position.

In transition zone X, the diameter of the spring coils is abruptly increased to diameter $d_2$ in the wearing region B. Diameter $d_2$ is larger than diameter $d_1$ and is chosen such that the retracting force of spring 42 is just sufficient to keep webbing 24 against the body of the wearer but not produce uncomfortable pressure. Preferably, diameter $d_2$ is substantially constant throughout region B so that the rewind force is constant regardless of the amount of webbing which is extracted from the spool. Region C represents the non-use region of spring 42 which is left on idler spool 34 during normal utilization of the spring motor.

In one typical embodiment of this invention, the diameter of drive spool 28 is 51 mm (2 in.), the diameter of idler spool 34 is 43 mm (1.7 in.) and the dimensions of spring 42 are length=3,000 mm (120 in.); width=18.8 mm (0.75 in.) and thickness=0.125 mm (0.005 in.). The diameter $d_1$ is 20 mm (0.8 in.) and the diameter $d_2$ is 30 mm (1.2 in.). The diameter of the coils in region C is 20 mm (0.8 in.). The length of region A is approximately 1125 mm (45 in.), region B is 1775 mm (71 in.) and region C is 10 mm (4 in.). The length of transition zone X is approximately 18.8 mm (0.75 in.). Transition zone X may typically range in length from 12 to 25 mm (0.5 to 1 in.), for example, and represents about one-third a revolution of the larger coils. Accordingly, it can be seen that the transition zone is an abrupt one. Preferably, the transition zone represents less than one full revolution of the larger coils.

Figure 2:
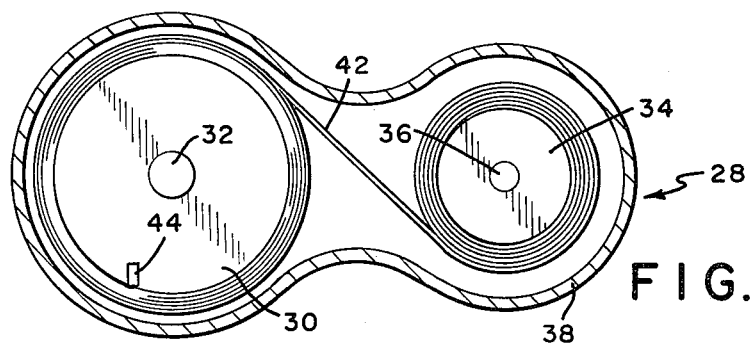
FIG. 2 is a side view of the spring motor of FIG. 1 taken along line 2—2.

In operation, when webbing 24 is fully wound up on spool 20, spring 42 is substantially wound up on idler spool 38. As webbing 24 is extracted, shaft 18 and its end 32 are rotated in a counter-clockwise direction (FIG. 2) together with drive spool 28. Rotation of drive spool 28 causes spring 42 from idler spool 24 to be wound up on its outer circumference. This causes spring 42 to be reversed bent from its pre-formed condition as it is wound up on drive spool 28 and thereby increases the torque required to retract webbing 24. Since the retraction torque is a function of the amount of reverse bending on spring 42, the small coils generate a larger torque than the larger coils. As a result, in region A the rewind force is sufficiently high so as to fully stow the webbing in the retractor.

When the webbing is retracted, idler spool 34 rotates in the counter-clockwise direction (FIG. 2) and spring 42 is transferred back to drive spool 34, with the drive spool being rotated in a clockwise direction.

Figure 4:
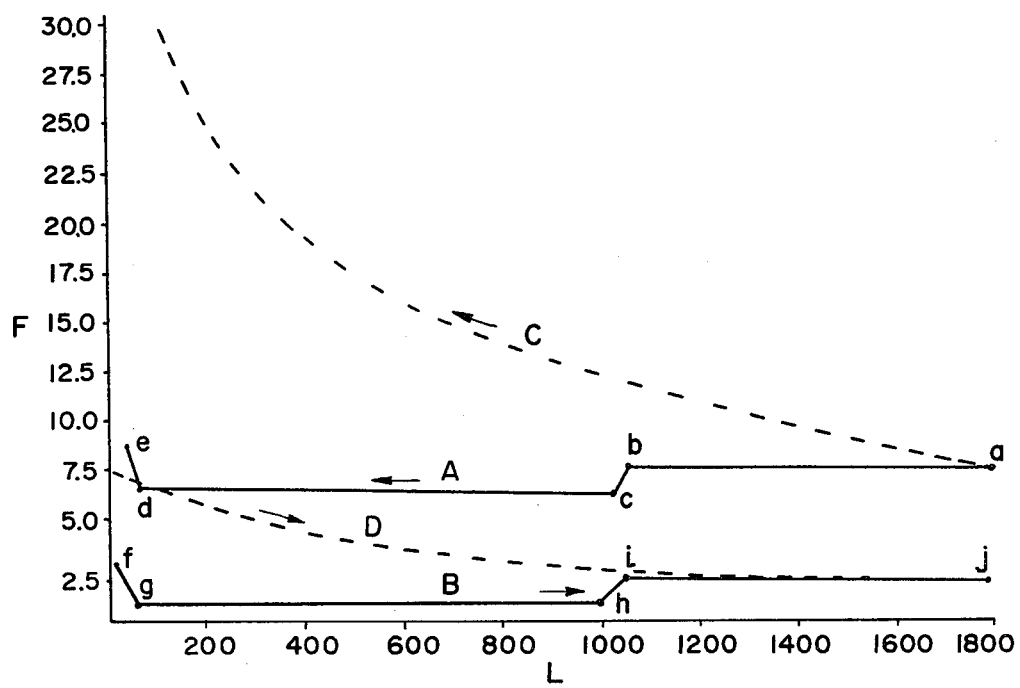
FIG. 4 is a graph comparing the rewind/extraction curves of the spring motor of this invention with a prior art spring motor.

FIG. 4 depicts a typical extraction/retraction curve for the rewind spring motor of this invention as shown in solid lines. In FIG. 4, F is the force on the webbing (in newtons) and L is the length of webbing on the retractor (in mm). In the extraction curve A, as webbing is extracted from a fully wound up spool (point a), the extraction force is fairly constant until the transition point b is reached. The distance a-b is region A in FIG. 3. An abrupt reduction in force F is noticed until point c. The distance b-c represents the transition zone X in FIG. 3 when the diameter of the coils is increased to region B in FIG. 3. The extraction force remains fairly constant in region B until point d is reached after which the force increases to point e. The distance d-e corresponds to the non-use zone C in FIG. 3 where the diameter of the coils is again decreased.

Referring to retraction curve B, when webbing is retracted from the fully extracted condition, the force F drops from point f to point g, which represents the start of region B in FIG. 3 and remains constant until the transition zone commences at point h. This zone ends at point i and the force is again fairly constant until point j, with the distance i-j representing region A in FIG. 3.

It can be seen that in the normal use region of the rewind spring motor of this invention, both the extraction and retraction forces are substantially constant, thereby providing a comfortable fit to all size persons regardless of the position of the seat. A significantly reduced extraction effort denotes region B so that the wearer definitely feels the reduced force. Similarly, a significantly increased retraction force is noted in the transition from regions B to A. It is believed that the abrupt increase in retraction force aids in assisting full parking of the webbing due to the rotational inertia transferred to the idler spool.

For comparison purposes, in FIG. 4 the dotted lines represent the extraction curve C and retraction curve D for a standard rewind spring in a seat belt retractor.

It can be seen that the present invention provides a negator type rewind spring motor assembly, which has an abrupt transition in coil sizes. As a result, a relatively low rewind force is exerted on the wearer and this force is abruptly increased so that the parking forces are sufficiently high to fully stow the webbing. Compared to a negator type spring having a gradual increase in coil size, as disclosed in the Takai et al, patent, the spring of this invention produces a higher parking force with no loss of comfort in the wearing zone.

We claim:

1. A rewind spring motor assembly comprising a drive spool, an idler spool and a rewind spring having a stretched S-shape disposed between said drive spool and idler spool; said rewind spring having a first end in communication with said drive spool; a second end in communication with said idler spool; a normal use region extending from said drive spool toward said idler spool and comprising a first portion in communication with said first end and having a first natural radius of curvature, and a second portion in communication with and extending from said first portion toward said idler spool, said second portion having a second natural radius of curvature, said second natural radius of curvature being larger than said first radius of curvature, a transition between said first and second portions being defined by an abrupt increase in the natural radius of curvature; and a surplus use region extending from said second portion to said second end of said spring.

2. The rewind spring motor assembly of claim 1 wherein said first natural radius of curvature is substantially constant throughout the length of said first portion and said second natural radius of curvature is substantially constant throughout the length of said second portion.

3. The rewind spring motor assembly of claim 2 wherein said second natural radius of curvature is substantially larger than said first natural radius of curvature.

4. The rewind spring motor assembly of claim 3 wherein the natural radius of curvature of said spring in said surplus use region is smaller than said second natural radius of curvature.

5. The rewind spring motor assembly of claim 4 wherein said transition represents less than one full revolution of the coils of said spring in said second portion.

6. In a seat belt retractor comprising a frame, a main shaft rotatable in said frame, a spool mounted on said shaft for rotation therewith, seat belt webbing having one end attached to said spool and adapted to be wound thereon, and a rewind spring motor mounted on said frame for winding said webbing on said spool and permitting said webbing to be extracted from said spool, the improvement comprising:

said rewind spring motor comprising:
a drive spool rotatable with said main shaft;
an idler spool mounted for rotation about a second shaft spaced from said main shaft; and
a rewind spring having a stretched S-shape and disposed between said drive spool and said idler spool; said rewind spring having a first end in communication with said drive spool; a second end in communication with said idler spool; a normal use region extending from said drive spool toward said idler spool and comprising a first portion in communication with said first end and having a first natural radius of curvature, and a second portion in communication with and extending from said first portion toward said idler spool, said second portion having a second natural radius of curvature, said second natural radius of curvature being larger than said first natural radius of curvature, the transition between said first and second portions being defined by an abrupt increase in the natural radius of curvature; and a surplus use region extending from said second portion to said second end of said spring.

7. The seat belt retractor of claim 6 wherein said first natural radius of curvature is substantially constant throughout the length of said first portion and said second natural radius of curvature is substantially constant throughout the length of said second portion.

8. The retractor of claim 7 wherein said second natural radius of curvature is substantially larger than said first natural radius of curvature.

9. The retractor of claim 8 wherein the natural radius of curvature in said surplus use region is smaller than said second natural radius of curvature.

10. The retractor of claim 9 wherein said transition represents less than one full revolution of the coils of said spring in said second portion.

* * * * *